April 26, 1949.  J. A. ASHWORTH ET AL  2,468,154
PERMEABILITY DETERMINATION
Filed Oct. 5, 1943  2 Sheets-Sheet 2
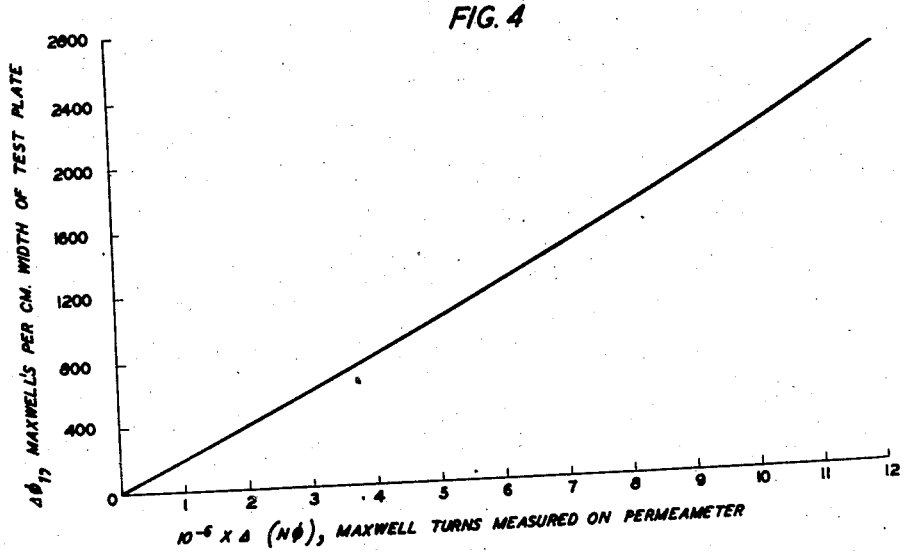
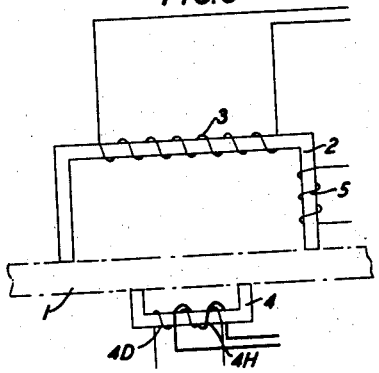
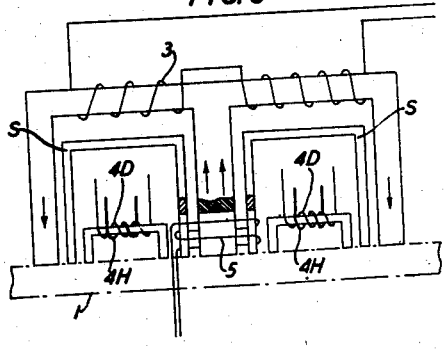
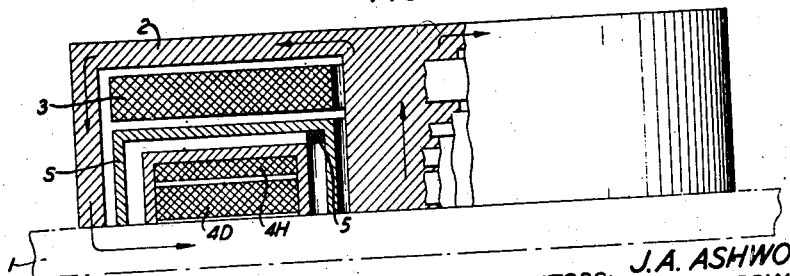
INVENTORS: J. A. ASHWORTH
R. A. CHEGWIDDEN
BY
ATTORNEY Patented Apr. 26, 1949

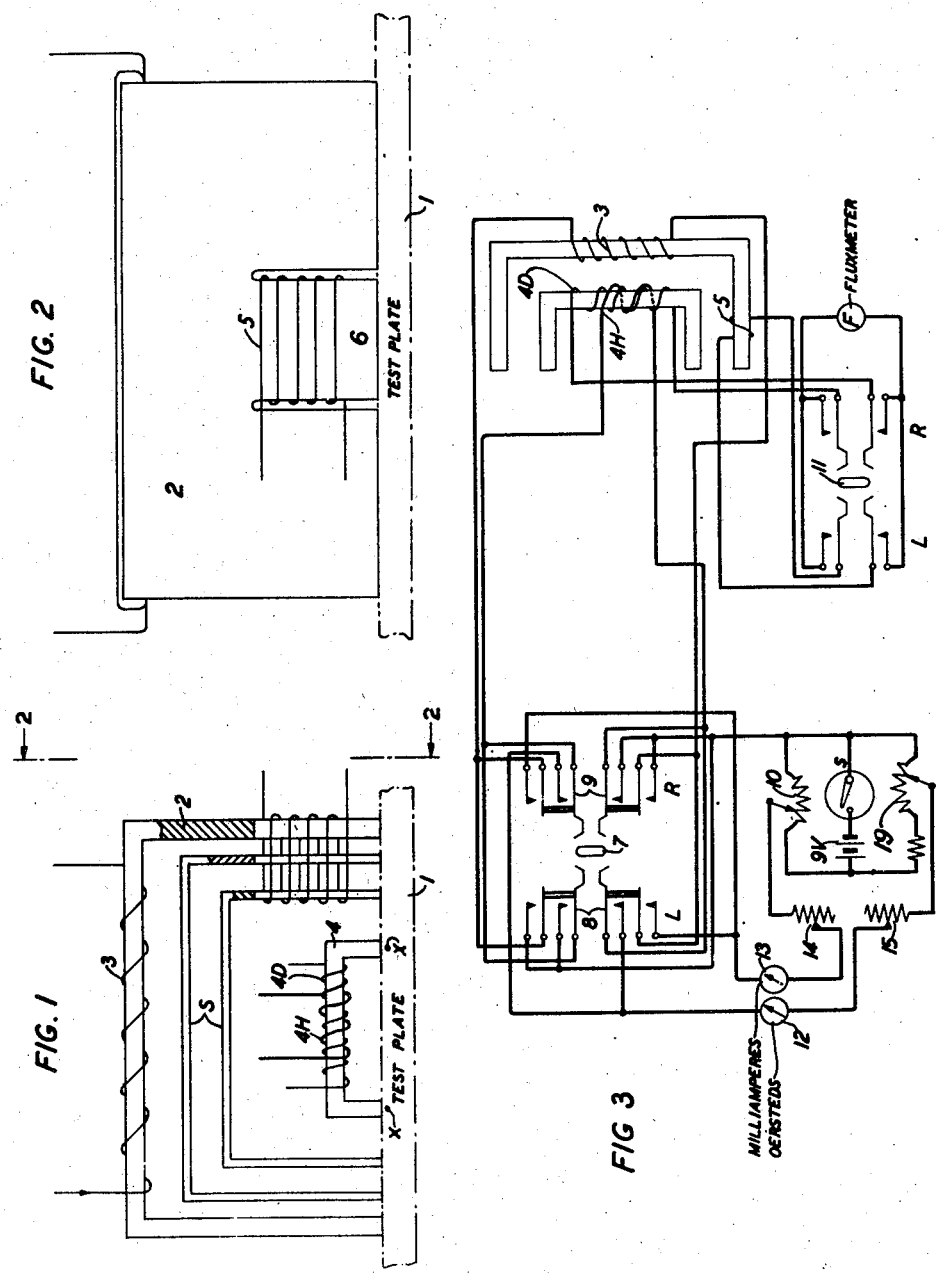

2,468,154

UNITED STATES PATENT OFFICE 2,468,154

PERMEABILITY DETERMINATION

Joseph A. Ashworth, Bernardsville, and Raymond A. Chegwidden, Chatham, N. J., assignors to Bell Telephone Laboratories, Incorporated, New York, N. Y., a corporation of New York Application October 5, 1943, Serial No. 504,998

22 Claims. (Cl. 175—183)

This invention relates to permeameters, devices to determine the permeability of plates, ship sides, boilers, pipes or other ferromagnetic materials.

Objects of the invention are to determine permeability of plates and similar objects having only one surface accessible, to determine the permeability of plates having one or two sides accessible independently of surface conditions, to examine magnetically an element of a complex assembly while it is in place in the assembly, to determine permeability of bodies independently of their surface conditions, to provide a device for sorting, examining, or inspecting magnetic sheet or other materials, to provide methods and apparatus for making determinations of permeability, to provide for determining the mean permeability of a plate in all radial directions in one plane, and to provide improved methods of and apparatus for accomplishing these and similar objects.

The objects of the invention are accomplished in the exemplary embodiments disclosed by a potentiometric method of measuring a magnetic field, H, or in other words by establishing a field of magnetic force, determining how much magnetic magnetizing force is required to equal or neutralize the field and determining, measuring, and indicating the required field, H. This field is set up in the body to be examined wholly by induction without necessity of applying any winding or windings to the body and its neutralization or equalization, measurement and indication are likewise accomplished without applying any winding or windings thereto.

Fig. 1 comprises a diagrammatic end view of the magnetic elements of the permeameter;

Fig. 2 comprises a diagrammatic side view thereof;

Fig. 3 comprises a circuit diagram with certain values of elements corresponding to a working exemplary model;

Fig. 4 represents a graph in which $\Delta \varphi_1$, the maxwells per centimeter width of test plate is plotted against $\Delta(N\varphi)$, the maxwell turns measured on the fluxmeter F in Fig. 3; and Figs. 5, 6 and 7 represent modifications.

The arrangements of Figs. 1, 3, 5, and 6 may be employed to examine magnetic bodies for anisotropic magnetism; that of Fig. 7 is useful for determining mean permeability in all directions parallel to a plane.

In Figs. 1 and 2 the sheet or plate 1 represents the magnetic material to be tested and a U-shaped yoke 2 supplies the magnetic field by virtue of a winding 3 supplied with current of adjustable magnitude and direction. The legs of yoke 3 are applied to the plate to be tested; good contact and a smooth surface are not essential for most purposes although somewhat better results may be obtained if the surface is bright and smooth.

Yoke 4 also rests upon the test plate and has two winding 4H and 4D; in use 4D is connected to a fluxmeter F (Fig. 3) and 4H is connected reversible to an adjustable source of voltage. Magnetic shields S will be later discussed. A search coil 5 surrounds a central leg 6 of the yoke 2 and also surrounds a leg of the shields S.

In the circuit diagram of Fig. 3 the 9-volt battery 9V is connected with potentiometers as shown and a reversing switch 7 serves to close the left-hand set of contacts 8 or the right-hand set 9. Winding 3 is oppositely connected to potentiometer resistance 10 in the two positions of switch 7 and winding 4H is oppositely connected to potentiometer resistance 19 in the two operated positions of switch 7. Switch 11 operates to the right to close the right-hand set of contacts, connects fluxmeter F to winding 4D and in left-hand position to close the left-hand set of contacts connects the fluxmeter to the search coil winding 5. Meter 13 is calibrated in milliamperes and meter 12 is calibrated in oersteds. A suitable switch s for opening the battery circuit is provided.

The fluxmeter F is a known type of instrument, sometimes described as a ballistic galvanometer having a high moment of inertia, negligible air damping, high regenerative damping, and a negligibly small control constant. Specifically, it may be a "Grassot" fluxmeter described in a printed publication issued by the Cambridge Instrument Company, Inc., of New York city under the title "The Grassot Fluxmeter, list 173," and further discussed in "The Review of Scientific Instruments," December 1939, vol. X, page 368. These publications are made a part hereof by reference.

The general theory of operation by reference to Figs. 1 and 2 is outlined as follows: The yoke 2 is placed upon the plate to be tested and a suitable magnetizing current supplied through winding 3. Yoke 4 also rests upon the test plate with winding 4D connected to a fluxmeter to note flux changes in yoke 4. When yoke 2 is magnetized a magnetomotive force exists across points X, X in the test plate and tends to drive flux through yoke 4. An opposing magnetomotive force is now exerted in winding 4H by a current in the winding; when this is of proper value and direction the flux through yoke 4 is zero and the specific properties of yoke 4, the test plate 1 and the air-gaps between do not enter into the computation of or value of this magnetomotive force.

Under this condition of balance the proximity of yoke 4 causes substantially no disturbance of the field in plate 1. To detect the balanced condition the currents in coil 3 and coil 4H are reversed simultaneously (as by switch 7, Fig. 3) whereupon the fluxmeter F indicates the net flux change which is zero at balance. By adjusting the current in coil 4H (as by potentiometer 19) after setting the current in coil 3 at a suitable value, the desired balance may be obtained and the presence of small air-gaps between yoke 4 and the plate is immaterial; the magnitude of flux in the plate 1 will vary widely with a given current in winding 3, and may be established at a desired value. If desired, the magnetizing force may be first set to a prescribed value by adjustment of the current in coil 4H and the balance then obtained by adjustment of the current in coil 3, the balance point being detected by simultaneous reversal of these currents in the manner above described.

High permeability shields S,S are located between yokes 2 and 4. These prevent leakage flux from passing from yoke 2 to yoke 4 and tend to make the flux in plate 1 more uniform over the area measured. The flux in the test plate is indicated by measuring with a fluxmeter the flux through the search winding 5 which may be connected to the fluxmeter for this purpose by closing the left-hand contacts of switch 11. The winding 5 does not encompass the whole leg of yoke 2 but only a central portion 6 thereof; this arrangement is especially good for testing plates of large area because the spreading of the flux at the edges of yoke 2 is large under these conditions. Coil 5 also encompasses the shields S,S and therefore any flux from yoke 2 which travels through the shields but not through the plate passes twice through winding 5, in opposite directions, and produces substantially zero effect upon winding 5.

To calibrate the yoke 4 one must find the relation of average magnetizing force across pole faces of yoke 4 as a function of the current in winding 4H when the flux through yoke 4 is zero. The yoke 4 was fastened to a long rectangular bar of steel magnetized by a direct current excited solenoid of about the same length as the bar. A search coil of known area turns was placed parallel to the bar and near yoke 4; the flux in yoke 4 was adjusted to zero and a balance established whereupon a relation between the current in coil 4H and the field in the bar was obtained. The field in the bar was taken as equal to that measured with the search coil. Upon repeating the calibration with bars of different magnetic properties and thicknesses it was found that one calibration was satisfactory for the whole range. There was a linear relation between the magnetizing force created by winding 4H and the magnetizing force along the calibrating bar, provided the flux in yoke 4 was zero. Therefore the scale of the milliammeter (12 in Fig. 3) which reads the current in winding 4H was calibrated in oersteds of magnetizing force.

The permeameter flux coils are also to be calibrated. The object of this calibration is to obtain the relation $$\varphi_1 = f(\varphi N)_p$$

where $\varphi_1$ is the flux through a cross-sectional area of the test plate normal to the direction of flux and of cross-section one centimeter multiplied by the thickness of the plate; the location of this section is the region of the plate between the poles of yoke 4; $(\varphi N)_p$ is the value of the flux turns measured by means of the fluxmeter connected to winding 5. $\varphi_1$ was measured directly on several plates of various thickness and kinds of steel with search coils of fine wire threaded through small holes drilled in the plates. Because the relation between $\varphi_1$ and $(\varphi N)_p$ will generally be slightly non-linear, it may be conveniently expressed or proposed in the form of a graph, an example of which for a particular instrument is shown in Fig. 4.

All the physical elements described above may be mounted in a suitable open-bottomed box with the fluxmeter and control apparatus in a separate case. Suitable handles, meter mountings, and adjusting dials for the variable elements will be supplied as a matter of course.

To utilize the instrument one may place the yokes 2 and 4 against the ship's plate or other magnetic body to be tested and place the control apparatus and fluxmeter in a convenient location, with key 11 operated to close its right contacts, the switch or key 7 in either position, all rheostats set to minimum current. The battery switch s is then closed and the fluxmeter read. Adjust rheostat 19 and resistance 15 until the desired value of magnetizing force at which the measurement is to be made is indicated in oersteds on meter 12. Then adjust and readjust rheostat 10 and resistance 14 and operate the reversing key 7 from side to side until the net deflection of the fluxmeter is zero for a full throw of reversing key 7. The permeameter is now balanced for the magnetizing force indicated on the meter 12.

To measure the flux in the plate move key 11 to close its left contact, i. e., fluxmeter connected to search coil 5 and operate reversing switch 7. From the fluxmeter reading, $\Delta(N\varphi)$ may be computed, i. e., the change of flux turns. Read on the curve of Fig. 4 the value of $\varphi_1$ corresponding to the indicated value of $\Delta(N\varphi)$. This value of $\varphi_1$ is the flux in the test plate through a cross-section one centimeter wide multiplied by the thickness of the plate and normal to the flux in the region where the magnetizing force H has the value indicated on the oersted meter 12. The permeability is then $$\mu = \frac{\phi_1}{Ht}$$

where $t$ is thickness of the plate in centimeters. The spot tested may be demagnetized either before or after a measurement, as is desired, by successively operating the reversing switch 7 while slowly reducing the magnetizing current to zero by means of rheostat 10.

The arrangement of Fig. 5 may be employed when both sides of the plate are accessible, the shields may be omitted and the plate 1, the yoke 2, the yoke 4, the winding and the search coil 5 being as indicated; the circuit is the same as Fig. 3. Of course the yoke 2 and yoke 4 would be in separate boxes in the general case except for working along the edge of a plate when they could be in one slotted box, with their poles upon opposite sides of the slot.

A further modified form is indicated in Fig. 6, in which the yoke 2 is double, two shields S,S are provided, two windings 4H and 4D are provided. The windings 4H are connected in parallel or series to set up fluxes as shown; windings 4D being in series and the search coil 5 encompasses both shields and the middle leg of yoke 2 as shown. Here, also, if both sides of the plate to be tested are accessible the shields may be omitted and the yokes 4 placed on the opposite sides of the plate from the yoke 2.

Fig. 7 represents a further modified form in which all parts are coaxial, the yoke 2 being expanded to a closed end cylinder with a central leg, the shield S being a toroid of U-shaped section, and the yoke 4 being a toroid of U-shaped secton. The device is located against a test plate 1 and the magnetizing winding 3, the balancing winding 4H, the detecting winding 4D and the search coil winding 5 being coaxial and located as indicated, the figure being a partial cross-section of all the parts including the windings. Such a device will indicate mean permeability in all directions in one plane. It also has a smaller leakage flux than some other forms of device and may be made small and compact.

In all the embodiments the pole faces may be curved about one axis to fit the external or internal surfaces of boilers or pipes curved upon one radius or curved about two axes to match bodies similarly curved, i. e., bodies which are concave or convex. Examination of plates of ships to discover cracks or defects can and has been done by arrangements in accordance with the invention; for this purpose it is not necessary to remove the paint or rust from the ships' plates, although a superficial cleaning may be advantageous. It may be used to determine the product of the thickness and permeability of magnetic sheet. Such devices have also been found useful for rapid sorting of magnetic sheet, for example, when heat treated and non-heat treated sheet have become commingled.

What is claimed is:

1. The method of determining permeability of a body of known thickness which includes the steps of establishing a magnetic flux in a region of the body solely by induction from poles external to the body, measuring said flux by means external to the body, producing a magnetizing force to set up in another body magnetically interlinked with said first-named body a field matching the gradient of the field between selected small areas of said region, and measuring the magnetomotive force necessary to set up the matching field.

2. The method of measuring the product of permeability and thickness of a sheet of ferromagnetic material which comprises establishing a gradient of magnetic potential in a region of the sheet solely by induction from magnetizing means external to the sheet, measuring the gradient between two selected areas of the region by establishing an equal drop of magnetic potential in a magnetized body having poles adjacent to those areas, and establishing the value of the required product from said measurement by observations of the magnetomotive force necessary to establish the equal drop and by measuring the flux between said areas in the above said ferromagnetic sheet.

3. The method of measuring magnetic permeability of a body of known thickness and indefinite area which comprises establishing a known flux density in a region of the body by applying magnetizing poles at separated points thereupon, establishing a magnetic difference of potential in another magnetic body interlinked with said first-named body equal to the difference of potential due to said flux density between two selected small areas of the body, and indicating the difference of potential thus established.

4. The method of measuring comparative uniformity of permeability in different regions or different directions or both in different regions and different directions of a magnetic body which comprises establishing a known magnetic flux density in a region of the body by applying magnetizing poles at separated points thereupon, selecting two small areas of the region and establishing a magnetic drop of potential in a magnetic path external to the body but magnetically coupled thereto equal to the magnetic drop between the areas within the body, measuring the magnetomotive force necessary to set up and establish said equal drop of magnetic potential, and repeating the foregoing steps over different regions or directions or both.

5. The method of examining magnetically a body which does not lend itself to being surrounded by magnetizing windings, which comprises, applying poles of a magnetized yoke to the surface of the body so as to establish a known uniform flux in the test area of the body, applying poles of a second magnetized yoke to the surface of the body at points within the test area established to be of different magnetic potential by the first yoke, shielding the yokes from each other to prevent direct induction therebetween in paths outside of said body, establishing the difference of magnetomotive potential between the poles of the second yoke to be equal to the difference of magnetomotive potential between the points to which they are applied, and indicating the properties of the body as a function of the magnetomotive force necessary to establish the required difference of potential between the poles of the second yoke.

6. The method of measuring magnetic permeability of a body of large unbroken area accessible from one side only which comprises establishing a field in a portion of the body, establishing a field external to the surface of the body, reversing both fields, measuring the flux change within and outside the body by means external to the body incident to the reversal of magnetic potential, adjusting the external fields until said external flux change is zero, measuring the magnetomotive force to set up the second field as adjusted, and measuring the flux change in the body when the external flux change is zero incident to the above said reversal of magnetic potentials.

7. Means for making magnetic measurement on a body having an unbroken surface of a large area comprising means for uniformly magnetizing a selected definite portion of the body by an externally applied field, a yoke applied to the surface within said portion of the body, means magnetically interlinked with said portion for establishing an opposing field in said yoke such that negligible flux passes between said yoke and the body, means for indicating the magnitude of said opposing field, and calibrated means including a search winding magnetically interlinked with said magnetizing means for indicating the flux in the selected portion of the body.

8. An instrument for testing a plate comprising a magnetizing yoke having a search winding upon a central portion of a leg of said yoke, a detecting yoke having means for establishing a field therein and poles applicable to the plate to be tested within the area uniformly magnetized by the magnetizing yoke, said yokes having poles applicable to the plate to be tested, means for causing the magnetizing yoke to establish a flux in the plate to be tested, means for reversing said flux, means for measuring the flux change through said search winding, calibrated means for relating said flux change to the maximum value of flux density in a selected region of the plate, and means for indicating the value of the field in the detecting yoke.

9. In combination, a magnetic magnetizing yoke having two poles, a central portion or leg comprised as a part of one pole, a search winding surrounding said central portion and not surround the rest of the pole, and a fluxmeter connected to the terminals of said search winding.

10. A magnetizing yoke having windings, an indicating yoke having windings, means for mounting said yokes so the pole faces of one lie upon points of a surface between the pole faces of the other, magnetic shield between said yokes, a winding encompassing a significant cross-section of said magnetic shield and a portion of said magnetizing yoke, and a flux meter in circuit with said last-named winding.

11. A magnetizing yoke, an indicating yoke having a winding thereon connected to a flux meter, one being mounted within and surrounded by the other, a high permeability shielding layer between said yokes, and a winding encompassing a portion of said high permeability shielding layer and a portion of said magnetizing yoke.

12. In combination, a magnetizing yoke for setting up a magnetic field in a body to be tested solely by surface contact, a flux indicating means associated with said yoke, a field indicating yoke for examining the field in the body solely through surface contact therewith, mounting means whereby said yokes may be simultaneously applied to the surface of said body, the poles of the first yoke defining a test area of the body and the second yoke being applied in a central part of the test area, and means, coupled to one of said yokes for measuring the field, whose indication is substantially independent of small variations in said contacts incident to paint, rust, irregularities, etc., of the surface of the body.

13. In combination, a magnetizing yoke having two poles to be applied to a body to produce a region of uniform flux density in said body, a detecting yoke having two poles to be applied in said region, means for establishing zero flux condition between the poles of the detecting yoke and the surfaces of the said region adjacent to each pole of the detecting yoke, and means for measuring the flux in the region of the body established by the magnetizing yoke incident to establishment of said zero flux condition in the detecting yoke.

14. In a combination otherwise according to claim 13, a magnetic shield separating said yokes.

15. A magnetizing yoke having a winding connected to a source of current for creating two magnetic poles to be applied to the surface of a body, a detecting yoke having a winding connected to a source of current for creating two poles to be applied to the surface of the body while thus magnetized in a region directly and centrally between the poles of the magnetizing yoke and on the same external surface, means for establishing zero flux condition between each pole face of the detecting yoke and the adjacent surface of the body, and means for measuring the flux in said body established incident to and at the time of production of said zero flux condition, said means comprising switches for reversing the current in said windings simultaneously, plus a fluxmeter connected to a winding upon said detecting yoke.

16. In a magnetic measuring device, a first yoke of magnetizable material for magnetizing a body to be tested by applying its poles to the body, a second yoke of magnetizable material for examining the magnetization produced in the body by application thereto of the first yoke, a shield between said yokes for preventing the passage therebetween of substantially all lines of magnetic force except such as traverse such body to be tested, said shield comprising magnetic material other than the body to be tested, and a search winding enclosing a central portion of a leg of said first yoke and a central portion of a leg of said shield.

17. In a magnetic measuring device, a first yoke of magnetizable material for magnetizing a body to be tested by applying its poles to the body, a second yoke of magnetizable material for examining the magnetization produced in the body by application thereto of the first yoke, a shield between said yokes for preventing the passage therebetween of substantially all lines of magnetic force except such as traverse such body to be tested, a search winding surrounding a section of the said shield and a centrally located portion of the pole of said first yoke whereby flux common to said first yoke and said shield has its effect upon said winding neutralized, and a fluxmeter in circuit with said search winding.

18. A magnetic testing device for testing the magnetic properties of bodies of material in the form of sheets having at least the length many times greater than the thickness and the width sufficient to render impracticable the application of windings about the bodies of the material, said device comprising a first yoke having pole faces for applying magnetic poles to considerably separated portions of the surface of such a body, a second yoke having pole faces considerably closer together for examining the magnetomotive potential difference between two points directly and centrally located on the surface of said body with respect to the poles of said first yoke, a magnetizing winding and a search winding on said first yoke, a magnetizing winding upon said second yoke connected to variable means including a current source for establishing variable conditions of magnetization in said second yoke, a flux measuring winding also upon said second yoke, and reversing instrumentalities for reversing the current through both said magnetizing windings.

19. A magnetic testing device for testing the magnetic properties of a body of material in the form of sheets having at least a length many times greater than the thickness and a width sufficient to render impracticable the application of windings about said body of the material, said device comprising for simultaneous application to a surface of said body a first yoke having pole faces for applying magnetic poles to considerably separated portions of the surface of said body, and a second yoke having pole faces considerably closer together for examining the magnetomotive potential difference between two points on the surface of said body, a current carrying magnetizing winding and a search winding on said first yoke, a magnetizing winding upon said second yoke connected to variable means including a current source for establishing variable conditions of magnetization in said second yoke, a flux measuring winding also upon said second yoke, and reversing instrumentalities for reversing the current through both said magnetizing windings, said search winding encircling a central portion only of said first yoke near the pole thereof whereby the effects of flux spreading near the edges of the pole are eliminated.

20. In a magnetic measuring device, a first yoke of magnetizable material for magnetizing a body to be tested by applying its poles to the body, a second yoke of magnetizable material for examining the magnetization produced in the body by application thereto of the first yoke, and a shield between said yokes for preventing the passage therebetween of substantially all lines of magnetic force except such as traverse such body to be tested, said shield comprising magnetic material other than the body to be tested, said first yoke having a central inner leg and an annular outer leg and said second yoke comprising a toroid of U-shaped cross-section with each leg of the U being an annulus.

21. A magnetic testing device for testing the magnetic properties of bodies of material in the form of sheets having a length and width sufficiently greater than the thickness to render impracticable the application of windings around the bodies of the material, said device comprising a double yoke having a leg in common to the two parts thereof, said yoke having pole faces for applying magnetic poles to considerably separated portions of the surface of such a body, two secondary yokes each having pole faces considerably closer together than the distance between an intermediate and an outer pole face of the first yoke, said secondary yokes being adapted to examine the magnetomotive potential difference between two points on the surface of said body, magnetizing windings connected in aiding relation with respect to current source means on the legs of said first yoke, magnetizing windings on the secondary yokes connected in aiding relation and connected to variable means including a current source for establishing variable conditions of magnetization in said secondary yokes, reversing instrumentalities for reversing the current simultaneously through all of said magnetizing windings, flux measuring windings on said secondary yokes connected in series, and a search winding surrounding a portion of the central leg of the first yoke.

22. A testing device otherwise in accordance with claim 21 including two shields one between each secondary yoke and the central and an outer leg of the double yoke and wherein the search winding surrounds a portion of each shield which is adjacent to the common leg of the double yoke.

JOSEPH A. ASHWORTH.
RAYMOND A. CHEGWIDDEN.

REFERENCES CITED

The following references are of record in the file of this patent:

UNITED STATES PATENTS

| Number | Name | Date |
|---|---|---|
| 1,005,857 | Lindquist | Oct. 17, 1911 |
| 1,066,293 | Lindquist | July 1, 1913 |
| 1,394,910 | Kierstead | Oct. 25, 1921 |
| 1,440,470 | Kinnard | Jan. 2, 1923 |
| 1,739,277 | Babbitt | Dec. 10, 1929 |
| 2,010,813 | Dysart | Aug. 13, 1935 |
| 2,114,189 | Kronmiller | Apr. 12, 1938 |
| 2,226,275 | Abbott et al. | Dec. 24, 1940 |
| 2,245,568 | Canfield | June 17, 1941 |
| 2,307,446 | Bettison | Jan. 5, 1943 |

FOREIGN PATENTS

| Number | Country | Date |
|---|---|---|
| 439,495 | France | June 14, 1912 |

OTHER REFERENCES

Spooner: Properties and Testing of Magnetic Materials; McGraw-Hill; 1st edition, 1927; pages 233-235. (Copy in Division 48.)